United States Patent [19]

Simpson

[11] 4,302,049

[45] Nov. 24, 1981

[54] HARNESS RELEASE ASSEMBLY

[76] Inventor: Elwood J. B. Simpson, 3130 Crownview Pasedo, Palos Verdes, Calif. 90274

[21] Appl. No.: 33,556

[22] Filed: Apr. 27, 1979

[51] Int. Cl.$^3$ ........................ A62B 35/00; B60R 21/10

[52] U.S. Cl. .................................. 297/484; 24/230 B; 24/205.17; 244/122 B; 280/808; 297/467

[58] Field of Search .................... 244/122 B, 122 AH; 297/484, 485, 467; 280/808, 806, 801; 24/230 A, 171, 194, 196

[56] References Cited

U.S. PATENT DOCUMENTS

| | | | |
|---|---|---|---|
| 1,692,826 | 11/1928 | Ganz | 24/230 A |
| 1,898,090 | 2/1933 | Lethern | 244/122 B |
| 2,171,496 | 8/1939 | Waite et al. | 24/205.17 X |
| 2,195,334 | 3/1940 | Lethern | 297/484 |
| 2,255,258 | 9/1941 | Lethern et al. | 24/205.17 X |
| 2,750,644 | 6/1956 | Martin et al. | 244/122 B |
| 2,763,451 | 9/1956 | Moran | 244/122 AH |
| 2,924,405 | 2/1960 | Dalglish et al. | 244/122 AH |
| 3,694,029 | 9/1972 | Noble et al. | 297/484 |
| 3,770,919 | 11/1973 | Lewis | 280/801 |
| 4,040,664 | 8/1977 | Tanaka | 297/484 X |
| 4,091,508 | 5/1978 | Yamada et al. | 280/808 X |

FOREIGN PATENT DOCUMENTS

| | | | |
|---|---|---|---|
| 575539 | 5/1959 | Canada | 297/484 |
| 570846 | 9/1923 | France | 24/205.17 |

*Primary Examiner*—James T. McCall
*Attorney, Agent, or Firm*—William H. Maxwell

[57] ABSTRACT

A single lever harness release assembly for simultaneous release of at least two separate safety straps used for securing persons in riding position seated in a vehicle, and comprising a base member and an overlying plate member establishing an oppositely opening receiver passage for the reception of opposite strap couplings, a pair of release pins carried in laterally spaced openings to enter the passage and disengageably secure said couplings respectively, and a selectively moveable spring biased lever means exposing said single lever and simultaneously withdrawing said pair of release pins when deliberately lifted or depressed.

33 Claims, 6 Drawing Figures

(SECURE)

(RELEASED)

HARNESS RELEASE ASSEMBLY

BACKGROUND

Safety harnesses are widely used to protect the passengers of vehicles, such as those persons driving cars and piloting aircraft. The purpose of such a harness is to keep the person properly seated and in position during maneuvers and/or when accidents occur. However, there are circumstances when it is imparative that the harness be released with facility, for example when accidents occur and when time is of the essence in extracting the harnessed person from dangerous situations, or to remove an injured person from the harness without further injury. Heretofore, the release of harness hardware has been complicated and awkward, and its release therefore time consuming, requiring more than one single operation in the process of release. And there are many instances where persons have been trapped in vehicles by virtue of the complications in release of the protective harness. Therefore, it is a general object of this invention to provide an improved single operation release for a safety harness, whereby the occupant or rescue party can remove the harness with but one manual operation; the lifting of or depression of a single lever as may be convenient under the particular circumstances.

Safety harnesses vary widely as circumstances require, it being a comprehensive harness with which this invention is particularly concerned. That is, the harness situations which are most critical are those involved with high performance vehicles such as racing cars and with aircraft, where full protection is required. Accordingly, comprehensive harnessing involves lap straps, crotch straps, and shoulder straps as well, and all of which must be releasable; it being an object of this invention to simultaneously release all of said straps with a single manual operation.

Operational accessibility is of prime concern herein, a natural and convenient placement of the release assembly where it is instinctively available for instant manipulation. In practice, the aforesaid lap, crotch and shoulder straps come together at the juncture of the lap and abdomen of the person to be harnessed or unharnessed, as the case may be. And as clearly shown in the drawings, there are five straps connections to be made-up and broken. It is to be understood that each strap is anchored securely to the vehicle (not shown) by an end fitting, one at each side of the legs, one between the legs, and one behind each shoulder. The straps are flexible webbing with adjustment means as will be described.

Security is a requirement, and to this end the release lever is not vulnerable to accidental release, although it is immediately available and accessible for deliberate manipulation. In carrying out this invention, the release lever is anteriorly disposed to project forwardly and upwardly in an obvious fashion, but protected by embracement within a guide. The release lever is employed to lift a pair of spring biased pins that releasably secure the lap straps, the crotch strap being secured to the base of the assembly carrying the lever operated release pins. A feature is the releasable couplings for the shoulder straps and which are slotted to slip over the lap strap couplings and to slide therefrom when said lap strap couplings are released from said pins. Noteworthy is the dual pin combination and individual adjustability of the lap straps at the said coupling therefor.

SUMMARY OF INVENTION

This invention relates to safety harnessing in vehicles, for the securement of persons in riding position during maneuvers and in case of accidents. Although the harness configuration of lap, crotch and shoulder straps is old, the hardware herein disclosed is unique as it provides an improved single lever assembly for the attachment and simultaneous release of all straps. A feature is the placement of the assembly at the juncture of the lap and abdomen of the person harnessed, and at the point where all straps are connected for securement. The assembly involves a release housing that carries a pair of spring biased pins releasably engageable with coupling adjustably attaching to the lap straps. The assembly is permanently attached to the crotch strap, and the shoulder strap is slideable onto the lap strap couplings for disengagement when said couplings are released from the pins. The invention is characterized by the single lever operator that is either liftable or depressible to lift the pins from the two coupling engagements respectively.

DRAWINGS

The various objects and features of this invention will be fully understood from the following detailed description of the typical preferred form and application thereof, throughout which description reference is made to the accompanying drawings, in which.

Figure 5:
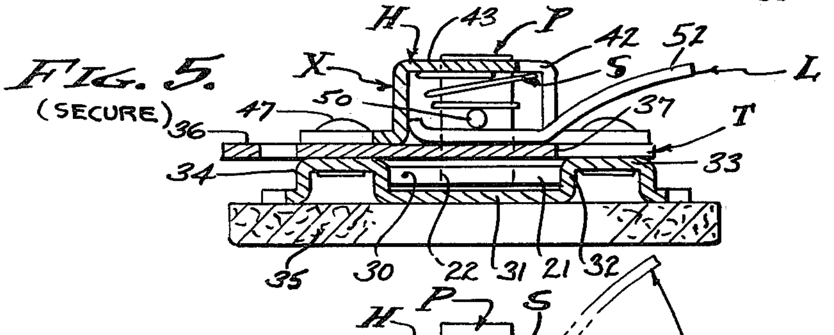
FIG. 5 is a transverse sectional view taken as indicated by line 5—5 on FIG. 3, and showing the exposed lever in a normal secure position.
Figure 6:
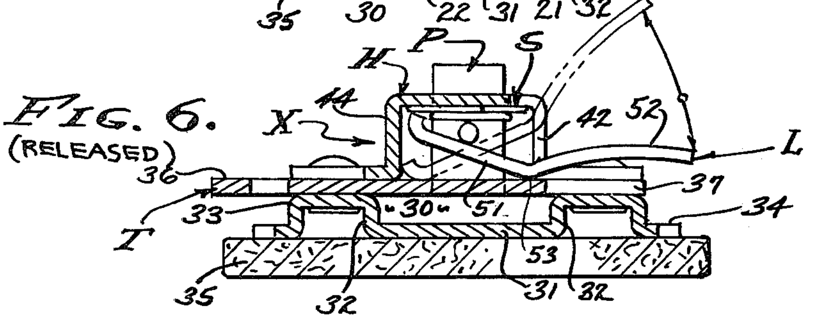

And, FIG. 6 is a view similar to FIG. 5 illustrating the dual function of the Second Class-First Class release lever which characterizes the present invention.

PREFERRED EMBODIMENT

The basic harness comprises a pair of lap straps 10 and 11 and a crotch strap 12 to which the release assembly X is attached, and in its preferred form includes a pair of shoulder straps 13 and 14. The straps 10–14 are each anchored into the vehicle structure (not shown) as by attachment means A at the terminal ends thereof respectively, there being a fastener opening through each attachment means to mount the strap so as to pull therefrom under tension. The straps 10–14 lead to a releasable connection point at the juncture of the person's lap and abdomen where the release assembly X of the present invention is located. In practice, the release assembly is permanently connected to the crotch strap 12 which is adjustable as to length as indicated by the adjustor at 15. Likewise, the shoulder straps 13 and 14 are adjustable as to length as indicated by the adjustors at 16 and 17. Connection of the lap straps 10 and 11 to the release assembly X is through coupling adjustors CA, while connection of the shoulder straps thereto is through slip couplings SC.

Referring now to the coupling adjustors CA, there is one for each of the two lap straps 10 and 11 disposed over the legs of the harnessed person. This coupling comprises a plate 20 from which a tongue 21 projects with an opening 22 through its end portion. The plate 20 is of a width to accommodate the strap, there being a transverse aperture 23 in the plate and over which an adjustment bar 24 is loosely disposed by ears 25 turned up at each side of the plate. This adjustment feature is common practice and through which the strap webbing is trained as shown and adjusted as to length. It is the tongue 21 and its opening 22 that is centered in and which is cooperatively received by the release assembly X as later described. As shown, the end portion of the tongue is joined to the plate by symmetrically divergent sides, concavely formed, that are guided into the release assembly X.

Referring now to the slip couplings SC, there is one thereof for each of the two shoulder straps 13 and 14 disposed over the shoulders of the harnessed person. This coupling comprises a slotted member 27 slideably engageable onto the above described tongue 21 of the coupling adjustor CA, in each instance. As shown, the member 27 is of plate form with a slot 28 loosely fitted over the tongue 21, and with a right angular turned portion attached to the end of the strap 13 or 14. The plane of member 27 is normal to the plane of the strap, and the strap loops through a normal extension 27' of the member 27 and lies flat against the anterior of the persons body to extend over the chest and shoulder in each instance.

In accordance with the present invention the release assembly X is provided to make up the releasable connection of the five separate harness straps 10–14. Characteristically, the release assembly X is a piece of hardware in the form of an assembly that relates the straps through operation of a single release lever L captured over a pair of release pins P guided through a tension plate T by a housing, and all of which overlies a base B that receives and guides the tongues 21 of the coupling adjustors CA to receive the release pins P, there being means to bias the pins P into reliable locked engagement with the tongues. In practice the release assembly X is fabricated of stampings that are rigid and secured together to capture the pins and release lever L in operating position biased by springs S.

The release assembly X is a flattened device adapted to lie against the abdomen of the harnessed person (more or less) where it is permanently connected to the crotch strap 12 and releasably connected to the lap straps 10 and 11. The base B is bilaterally symmetrical in alignment with the crotch strap which extends from a slot in the tension plate T that overlies the base so as to establish a transverse receiver passage 30 therethrough. Accordingly, the base has a depressed planar portion 31 between parallel walls 32 normal thereto and from which there are opposite outwardly turned flanges 33. Additionally, there are mounting legs 34 at each of the four corners of the base, carrying a soft leather safety pad 35 disposed between the device and the body of the person secured. A feature is the shallow passage 30 with its flared openings at opposite sides of the base, convexely radiused so as to engage the greater concaved radii of sides 26 of the coupling adjustor CA.

The tension plate T is flat, slotted at its bottom margin 36 for permanent connection to the crotch strap 12, and recessed at 37 through its top margin to accommodate the release lever L. As shown, the flat tension plate T closes a channel formed in the base in order to establish the passage 30, there being a pair of guide openings through the plate T and one at each side thereof centrally over the receiver passage and located equidistant from each opposite side 35 of the base. The said guide openings slideably receive the two release pins P respectively.

The housing H is a hat-section that is disposed over the tension plate T in alignment with the receiver passage 30 beneath the said plate and centered over the axes of the two pins P guided by said openings through the said plate. The housing H coextensively overlies the plate T and underlying base B, and it is recessed at 42 through its top margin to accommodate the release lever L. In practice, the housing establishes an open ended tunnel extending transversely over the plate, and with a top 43 and flanged legs 44 secured to said plate. There is a pair of guide openings 45 and 46 through the top 43 and in alignment with the said openings through the plate T, to slideably receive the two release pins P respectively. Securement of the assembly is by means of rivets 47 at each of the four corners thereof, extending through the base, the plate, and the housing, and permanently securing them together; or as by means of welding or the like.

The release pins P are alike and each is a right cylinder with flat normal ends, the active end 48 being chamfered at one side 49 to cam over the coupling tongues 21. In the locked position the ends 48 of pins P bottom near to the top surface of plate T while the remaining portions of the pins remain carried in the guide openings 45–46 respectively. A feature is the retainer 50 that extends diametrically through each of the pins P to bias the pins from compression springs S engaged between the top 43 and said retainers 50, and to orient them rotatively and above the plate T. It will be observed that the retainers 50 inherently extend transversely engaged with the lever L later described. The retainer 50 is a rod pressed through the pin to project a limited distance from each side thereof, and spaced above the receiver plate T when the pins P are at their near bottom lock positions.

Figure 1:
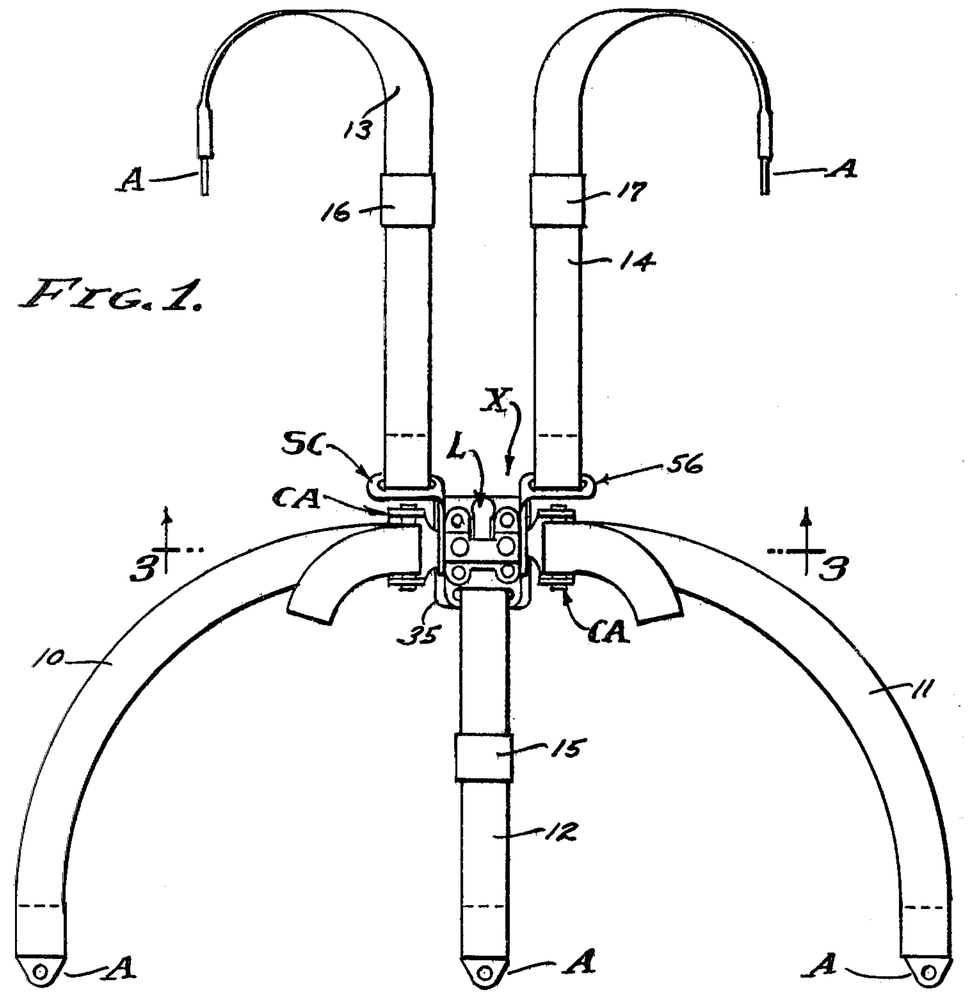
FIG. 1 is a front elevation view of a typical harness with the release assembly of the present invention adapted thereto.
Figure 2:
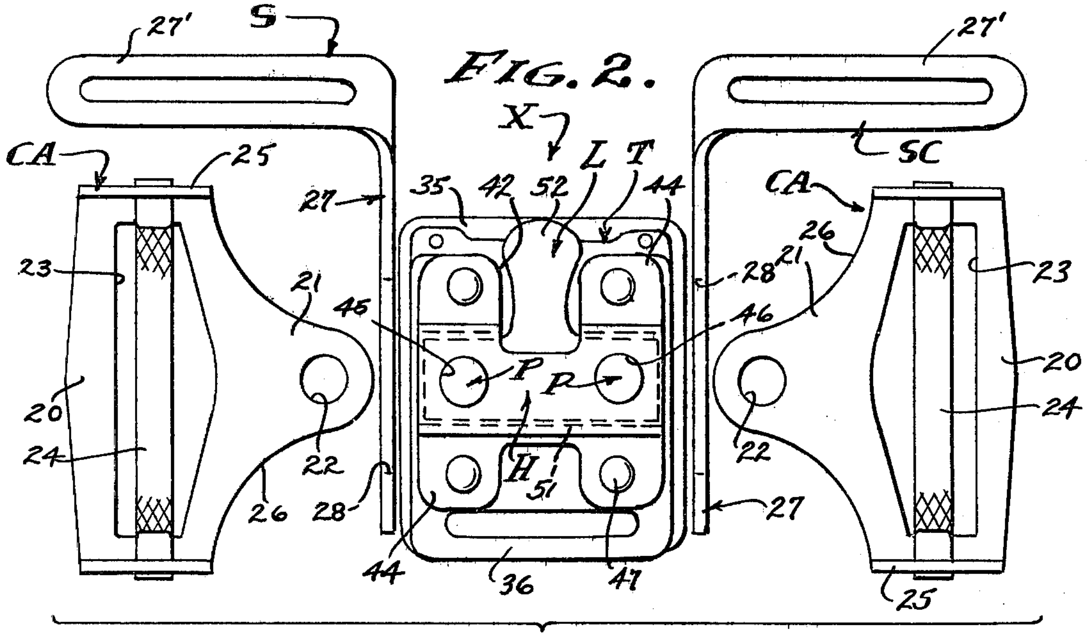
FIG. 2 is an enlarged exploded view of the release assembly components shown in FIG. 1.
Figure 3:
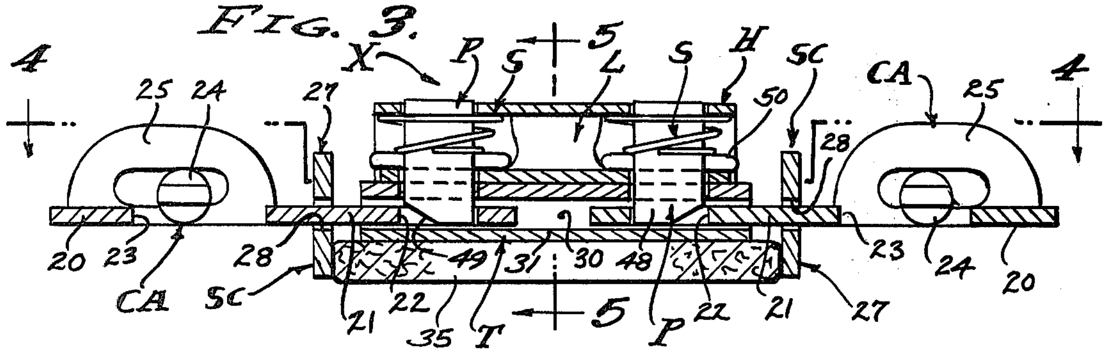
FIG. 3 is an enlarged detailed sectional view taken as indicated by line 3—3 on FIG. 1.
Figure 4:
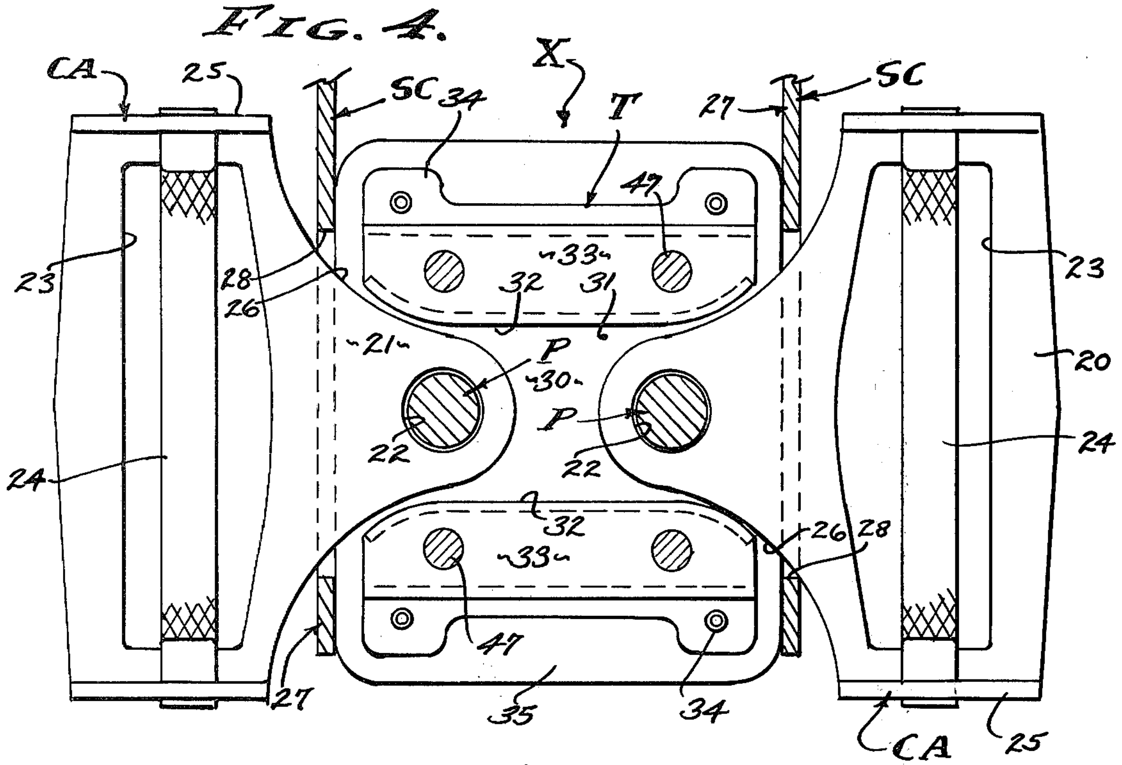
FIG. 4 is a plan section taken as indicated by lines 4—4 on FIG. 3.

In accordance with this invention there is the release lever L for simultaneous withdrawal of release pins P and for release of the two coupling adjustors CA. The release lever L is a "T"-shaped member (see FIG. 2), the head 51 of which is accommodated loosely within the housing tunnel, and the exposed lever 52 of which extends through the rregistered recesses of the receiver plate T and housing H. Release lever L is a dual purpose Second Class-First Class lever having an intermediate fulcrum at 53, at the juncture of the head 51 and leg 52. In the normal lock position the head 51 lies flat against the receiver plate T, there being a pair of pin openings 54 and 55 through the head and in alignment with the openings in the base and tension plate and loosely passing the two pins P respectively. The exposed lever 52 is the operator of the lever L and it extends angularly from the fulcrum at 53 and through the recess 42 for manual engagement at the exterior of the housing H. As shown, the exposed operating lever projects upwardly and outwardly from the receiver plate T at an acute angle, but no higher than the top of housing H. Accordingly, when the exposed lever 52 is either lifted or depressed the retainers 50 engaged by the head 51 are lifted against the pressure of springs S, and the pair of release pins P are thereby raised from the passage 30 so as to simultaneously free the coupling adjustors CA.

From the phantom and solid lines of FIG. 6 it will be seen that one lifting or depressing manual operation ensures freedom of the five strap members, the lap straps 10 and 11 being freed from their primary connection to the two separate release pins P, and the shoulder straps 13 and 14 being freed from their secondary connection through the sliding coupling engagement CA-SC.

Having described only a typical preferred form and application of my invention, I do not wish to be limited or restricted to the specific details herein set forth, but wish to reserve to myself any modifications or variations that may appear to those skilled in the art as set forth within the limits of the following claims:

I claim:

1. A single lever harness release assembly for simultaneous release of at least two separate seating straps and the like, and including;

a base member and an overlying tension plate member establishing a transversely disposed oppositely opening receiver passage therebetween, a pair of release pins retractably carried in laterally spaced openings to enter the passage, opposite coupling tongues received into opposite end portions of the passage and with openings therein releasably engaged by said release pins respectively, and a spring biased lever means having a lever with a fulcrum bearing on the tension plate at the juncture of the exposed lever and head engageable with and to simultaneously lift said pair of release pins.

2. The single lever harness release assembly as set forth in claim 1, wherein a soft pad is carried by and overlies the base member and disposed between the assembly and person's body secured thereby.

3. The single lever harness release assembly as set forth in claim 1, wherein the base member is transversely depressed and the tension plate member flat and overlying the transverse depression to form said receiver passage.

4. The single lever harness release assembly as set forth in claim 1, wherein the tension plate member has the said laterally spaced openings retractably carrying the pair of release pins to enter the passage.

5. The single lever harness release assembly as set forth in claim 1, wherein the base member is transversely depressed and the tension plate member flat and overlying the transverse depression to form said receiver passage, and wherein the tension plate member has the laterally spaced openings retractably carrying the retractable release pins to enter the passage.

6. The single lever harness release assembly as set forth in claim 1, wherein the spring biased lever means comprises a Second Class-First Class lever with fulcrums bearing at one end and at the juncture of the exposed lever and head shiftable by either lifting or depressing said exposed lever and operating the head engageable with and to simultaneously lift said pair of release pins.

7. The single lever harness release assembly as set forth in claim 1, wherein the spring biased lever means comprises a housing overlying the tension plate member and a First Class lever with a fulcrum bearing at the juncture of the exposed lever and head loosely accommodated within the housing and with springs seated against the housing to depress the head and said pair of release pins to be lifted by revolvement of the lever.

8. The single lever harness release assembly as set forth in claim 1, wherein the spring biased lever means comprises a housing overlying the tension plate member and a Second Class-First Class lever with fulcrums bearing at one end and at the juncture of the exposed lever and head shiftable by either lifting or depressing said exposed lever and operating the head loosely accommodated within the housing and with springs seated against the housing to depress the head and said pair of release pins to be lifted by revolvement of the lever.

9. The single lever harness release assembly as set forth in claim 1, wherein the spring biased lever means comprises a housing overlying the tension plate member and a First Class lever with a fulcrum bearing at the juncture of the exposed lever and head loosely accommodated within the housing, there being retainers projecting laterally from the release pins to engage against the head of the lever and springs seated against the housing and against the retainers to depress the head and said pair of release pins to be lifted by revolvement of the lever.

10. The single lever harness release assembly as set forth in claim 1, wherein the spring biased lever means comprises a housing overlying the tension plate member and a Second Class-First Class lever with fulcrums bearing at one end and at the juncture of the exposed lever and head shiftable by either lifting or depressing said exposed lever and operating the head loosely accommodated within the housing, there being retainers projecting laterally from the release pins to engage against the head of the lever and springs seated against the housing and against the retainers to depress the head and said pair of release pins to be lifted by revolvement of the lever.

11. The single lever harness release assembly as set forth in claim 1, wherein the tension plate member has the said laterally spaced openings retractably carrying the pair of release pins to enter the passage, wherein the base member is transversely depressed and the tension plate member flat and overlying the transverse depression to form said receiver passage, and wherein the spring biased lever means comprises a First Class lever with a fulcrum bearing at the juncture of the exposed lever and head engageable with and to simultaneously lift said pair of release pins.

12. The single lever harness release assembly as set forth in claim 1, wherein the tension plate member has the said laterally spaced openings retractably carrying the pair of release pins to enter the passage, wherein the base member is transversely depressed and the tension plate member flat and overlying the transverse depression to form said receiver passage, and wherein the spring biased lever means comprises a Second Class-First Class lever with fulcrums bearing at one end and at the juncture of the exposed lever and head shiftable by either lifting or depressing said exposed lever and operating the head engageable with and to simultaneously lift said pair of release pins.

13. The single lever harness release assembly as set forth in claim 1, wherein the tension plate member has the said laterally spaced openings retractably carrying the pair of release pins to enter the passage, wherein the base member is transversely depressed and the tension plate member flat and overlying the transverse depression to form said receiver passage, and wherein the spring biased lever means comprises a housing overlying the tension plate member and a First Class lever with a fulcrum bearing at the juncture of the exposed lever and head loosely accommodated within the housing and with springs seated against the housing to depress the head and said pair of release pins to be lifted by revolvement of the lever.

14. The single lever harness release assembly as set forth in claim 1, wherein the tension plate member has the said laterally spaced openings retractably carrying the pair of release pins to enter the passage, wherein the base member is transversely depressed and the tension plate member flat and overlying the transverse depression to form said receiver passage, and wherein the spring biased lever means comprises a housing overlying the tension plate member and a Second Class-First Class lever with fulcrums bearing at one end and at the juncture of the exposed lever and head shiftable by either lifting or depressing said exposed lever and operating the head loosely accommodated within the housing and with springs seated against the housing to depress the head and said pair of release pins to be lifted by revolvement of the lever.

15. The single lever harness release assembly as set forth in claim 1, wherein the tension plate member has the said laterally spaced openings retractably carrying the pair of release pins to enter the passage, wherein the base member is transversely depressed and the tension plate member flat and overlying the transverse depression to form said receiver passage, and wherein the spring biased lever means comprises a housing overlying the tension plate member and a First Class lever with a fulcrum bearing at the juncture of the exposed lever and head loosely accommodated within the housing, there being retainers projecting laterally from the release pins to engage against the head of the lever and springs seated against the housing and against the retainers to depress the head and said pair of release pins to be lifted by revolvement of the lever.

16. The single lever harness release assembly as set forth in claim 1, wherein the tension plate member has the said laterally spaced openings retractably carrying the pair of release pins to enter the passage, wherein the base member is transversely depressed and the tension plate member flat and overlying the transverse depression to form said receiver passage, and wherein the spring biased lever means comprises housing overlying the tension plate member and a Second Class-First Class lever with fulcrums bearing at one end and at the juncture of the exposed lever and head shiftable by either lifting or depressing said exposed lever and operating the head loosely accommodated within the housing, there being retainers projecting laterally from the release pins to engage against the head of the lever and springs seated against the housing and against the retainers to depress the head and said pair of release pins to be lifted by revolvement of the lever.

17. A single lever harness release assembly for simultaneous release of lap straps and shoulder straps from a crotch strap, and including;

- a base member and an overlying tension plate member attached to the crotch strap, said members establishing a transversely disposed oppositely opening receiver passage therebetween,
- a pair of release pins retractably carried in laterally spaced openings to enter the passage,
- opposite lap strap coupling tongues slideably engaged through openings in coupling members attached to opposite shoulder straps respectively and received into opposite end portions of the passage and with openings therein releasably engaged by said release pins respectively,
- and spring biased lever means having an exposed lever with an operating head to simultaneously lift said pair of release pins when manually depressed.

18. The single lever harness release assembly as set forth in claim 17, wherein a soft pad is carried by and overlies the base member and disposed between the assembly and person's body secured thereby.

19. The single lever harness release assembly as set forth in claim 17, wherein the base member is transversely depressed and the tension plate member flat and overlying the transverse depression to form said receiver passage.

20. The single lever harness release assembly as set forth in claim 17, wherein the tension plate member has the said laterally spaced openings retractably carrying the pair of release pins to enter the passage.

21. The single lever harness release assembly as set forth in claim 17, wherein the base member is transversely depressed and the tension plate member flat and overlying the transverse depression to form said receiver passage, and wherein the tension plate member has the laterally spaced openings retractably carrying the retractable release pins to enter the passage.

22. The single lever harness release assembly as set forth in claim 17, wherein the spring biased lever means comprises a First Class lever with a fulcrum bearing at the juncture of the exposed lever and head engageable with and to simultaneously lift said pair of release pins.

23. The single lever harness release assembly as set forth in claim 17, wherein the spring biased lever means comprises a Second Class-First Class lever with fulcrums bearing at one end and at the juncture of the exposed lever and head shiftable by either lifting or depressing said exposed lever and operating the head engageable with and to simultaneously lift said pair of release pins.

24. The single lever harness release assembly as set forth in claim 17, wherein the spring biased lever means comprises a housing overlying the tension plate member and a first Class lever with a fulcrum bearing at the juncture of the exposed lever and head loosely accommodated within the housing and with springs seated against the housing to depress the head and said pair of release pins to be lifted by revolvement of the lever.

25. The single lever harness release assembly as set forth in claim 17, wherein the spring biased lever means comprises a housing overlying the tension plate member and a Second Class-First Class lever with fulcrums bearing at one end and at the juncture of the exposed lever and head shiftable by either lifting or depressing said exposed lever and operating the head loosely accommodated within the housing and with springs seated against the housing to depress the head and said pair of release pins to be lifted by revolvement of the lever.

26. The single lever harness release assembly as set forth in claim 17, wherein the spring biased lever means comprises a housing overlying the tension plate member and a First Class lever with a fulcrum bearing at the juncture of the exposed lever and head loosely accommodated within the housing, there being retainers projecting laterally from the release pins to engage against the head of the lever and springs seated against the housing and against the retainers to depress the head and said pair of release pins to be lifted by revolvement of the lever.

27. The single lever harness release assembly as set forth in claim 17, wherein the spring biased lever means comprises a housing overlying the tension plate member and a Second Class-First Class lever with fulcrums bearing at one end and at the juncture of the exposed lever and head shiftable by either lifting or depressing said exposed lever and operating the head loosely accommodated within the housing, there being retainers projecting laterally from the release pins to engage against the head of the lever and springs seated against the housing and against the retainers to depress the head and said pair of release pins to be lifted by revolvement of the lever.

28. The single lever harness release assembly as set forth in claim 17, wherein the tension plate member has the said laterally spaced openings retractably carrying the pair of release pins to enter the passage, wherein the base member is transversely depressed and the tension plate member flat and overlying the transverse depression to form said receiver passage, and wherein the spring biased lever means comprises a First Class lever with a fulcrum bearing at the juncture of the exposed lever and head engageable with and to simultaneously lift said pair of release pins.

29. The single lever harness release assembly as set forth in claim 17, wherein the tension plate member has the said laterally spaced openings retractably carrying the pair of release pins to enter the passage, wherein the base member is transversely depressed and the tension plate member flat and overlying the transverse depression to form said receiver passage, and wherein the spring biased lever means comprises a Second Class-First Class lever with fulcrums bearing at one end and at the juncture of the exposed lever and head shiftable by either lifting or depressing said exposed lever and operating the head engageable with and to simultaneously lift said pair of release pins.

30. The single lever harness release assembly as set forth in claim 17, wherein the tension plate member has the said laterally spaced openings retractably carrying the pair of release pins to enter the passage, wherein the base member is transversely depressed and the tension plate member flat and overlying the transverse depression to form said receiver passage, and wherein the spring biased lever means comprises a housing overlying the tension plate member and a First Class lever with a fulcrum bearing at the juncture of the exposed lever and head loosely accommodated within the housing and with springs seated against the housing to depress the head and said pair of release pins to be lifted by revolvement of the lever.

31. The single lever harness release assembly as set forth in claim 17, wherein the tension plate member has the said laterally spaced openings retractably carrying the pair of release pins to enter the passage, wherein the base member is transversely depressed and the tension plate member flat and overlying the transverse depression to form said receiver passage, and wherein the spring biased lever means comprises a housing overlying the tension plate member and a Second Class-First Class lever with fulcrums bearing at one end and at the juncture of the exposed lever and head shiftable by either lifting or depressing said exposed lever and operating the head loosely accommodated within the housing and with springs seated against the housing to depress the head and said pair of release pins to be lifted by revolvement of the lever.

32. The single lever harness release assembly as set forth in claim 17, wherein the tension plate member has the said laterally spaced openings retractably carrying the pair of release pins to enter the passage, wherein the base member is transversely depressed and the tension plate member flat and overlying the transverse depression to form said receiver passage, and wherein the spring biased lever means comprises a housing overlying the tension plate member and a First Class lever with a fulcrum bearing at the juncture of the exposed lever and head loosely accommodated within the housing, there being retainers projecting laterally from the release pins to engage against the head of the lever and springs seated against the housing and against the retainers to depress the head and said pair of release pins to be lifted by revolvement of the lever.

33. The single lever harness release assembly as set forth in claim 17, wherein the tension plate member has the said laterally spaced openings retractably carrying the pair of release pins to enter the passage, wherein the base member is transversely depressed and the tension plate member flat and overlying the transverse depression to form said receiver passage, and wherein the spring biased lever means comprises a housing overlying the tension plate member and a Second Class-First Class lever with fulcrums bearing at one end and at the juncture of the exposed lever and head shiftable by either lifting or depressing said exposed lever and operating the head loosely accommodated within the housing, there being retainers projecting laterally from the release pins to engage against the head of the lever and springs seated against the housing and against the retainers to depress the head and said pair of release pins to be lifted by revolvement of the lever.

* * * * *